July 5, 1955  F. D. WILLIAMS, JR  2,712,565
ELECTROCHEMICAL CELL
Filed Aug. 7, 1953
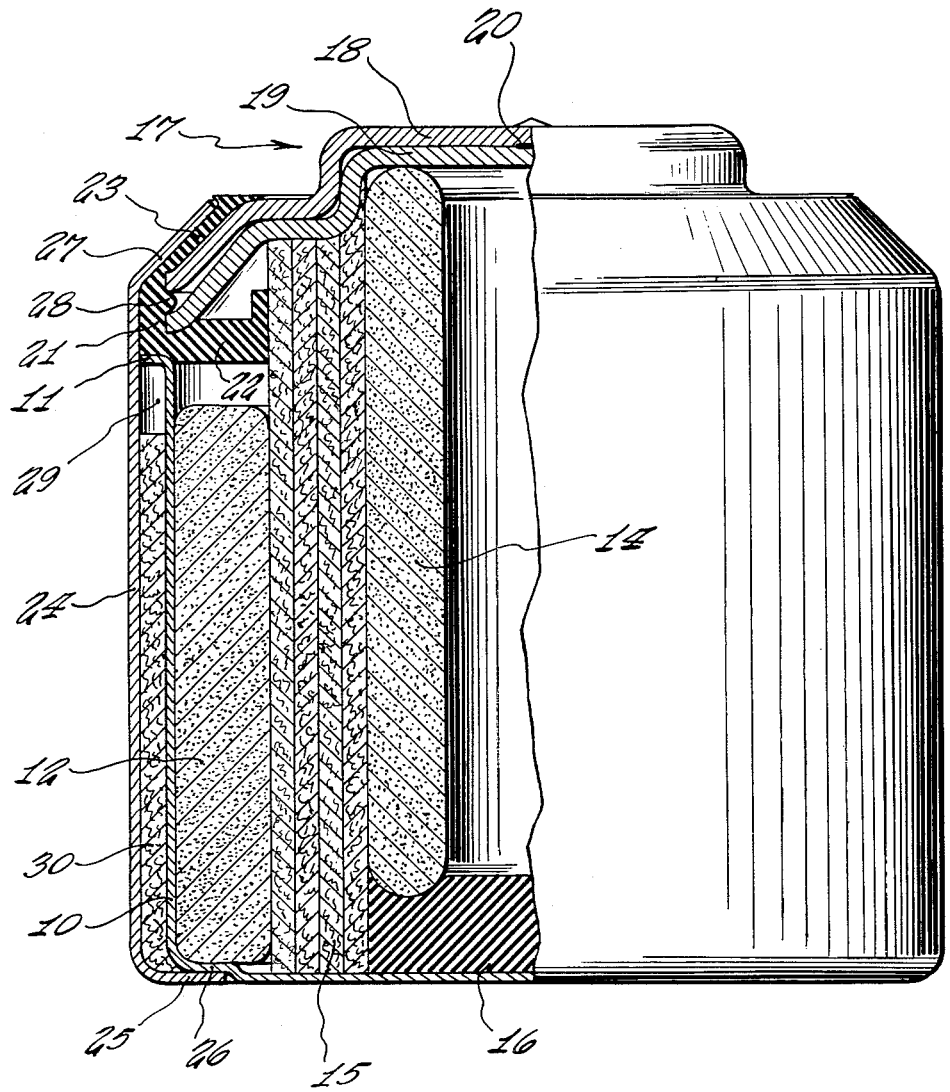
INVENTOR.
Fred D. Williams, Jr.
BY
ATTORNEY

United States Patent Office 2,712,565
Patented July 5, 1955

2,712,565

ELECTROCHEMICAL CELL

Fred D. Williams, Jr., New Rochelle, N. Y., assignor to Samuel Ruben, New Rochelle, N. Y.

Application August 7, 1953, Serial No. 372,997

15 Claims. (Cl. 136—107)

This invention relates to electrochemical cells and, more particularly, to an alkaline dry cell of novel and improved character.

Alkaline dry cells of the type disclosed in Ruben Patent No. 2,422,045, dated June 10, 1947, generally comprise a pair of terminals in the form of metal cups or shells which together with in insulating sealing collar compressed between cooperating marginal portions thereof constitute a sealed enclosure for the cell. One of these cups or shells is in electrical contact with a suitable cathode depolarizer, such as a mixture of mercuric oxide and graphite, whereas the other one of said cups or shells is in contact with the anode which is preferably of amalgamated zinc. An immobilized body of an alkaline electrolyte, such as potassium hydroxide containing a substantial amount of zincate, is interposed between the cathode and the anode. In the preferred form of the Ruben cell, one of the terminals is in the form of a cylindrical can and the other is a top closure member in the form of a dished metal plate, formed of zinc or of a metal having a low electrochemical potential with respect to zinc, such as copper, brass, or in-plated steel.

In cells of the described character, considerable difficulties were experienced with electrolyte creepage. Even though the compressed insulating sealing collar provided a generally air-tight seal for the cell, a small amount of electrolyte would frequently creep along the inner surface of the top closure disc and progressing around the edge of the said disc would arrive to the top surface thereof. When even a small quantity of electrolyte would be present on the top surface of the closure disc and become exposed to the atmosphere, such electrolyte would react with the carbon dioxide in the air and would cause the formation of incrustations. Such incrustations, in addition to causing corrosion, would constitute an insulating film on the top closure plate which would increase the contact resistance between said plate and the contact spring by means of which the cell was connected to an external circuit. While the incrustations could be readily removed, for example, by washing the cell with a dilute solution of ammonium hydroxide, it was a frequent source of operating difficulties. Although, from time to time, various suggestions and proposals were made to eliminate the foregoing difficulty, none of these suggestions or proposals were completely satisfactory or successful.

I have discovered a simple, highly effective and completely satisfactory solution for the outstanding problem.

It is an object of the present invention to provide an alkaline dry cell of novel and improved character which is completely free from the detrimental effects of electrolyte creepage.

It is a further object of the present invention to provide an alkaline primary dry cell which is free from electrolyte leakage and which also incorporates means for the release of excessive internal pressures from the cell that may arise under abnormal operating conditions.

The invention also contemplates an alkaline dry cell the terminals of which remain clean and free from corrosion or incrustations for long periods of time and which may be readily manufactured on a practical and industrial scale at a low cost.

Other and further objects and advantages of the present invention will become apparent from the following description, taken in conjunction with the accompanying drawing which is a vertical sectional view, having parts in elevation, of an electro-chemical cell embodying the invention.

Broadly stated, in accordance with the principles of the present invention, I provide a metal casing or can and a top closure member therefor which comprises a pair of metal plates or discs. Preferably, these discs are of such shape that their center portions are interfitting or are nested in each other while their edges are slightly separated. The marginal portions of the inner can and of the top closure discs have an insulating sealing member or collar of elastic material interposed therebetween, a portion of said sealing collar extending around the edges of the discs and being continued for a short distance.

An outer can or jacket encircles the inner can and is constricted at one end directly above the sealing collar to apply sealing pressure thereon, thereby defining a substantially air-tight enclosure for the cell. In the assembled position, an intermediate portion of the sealing collar is forced to extend into the interspace between the edges of the two top discs and thereby further improves the air-tight character of the seal. For best results, the inner top disc is formed of or is at least plated with a metal having a low potential with respect to the anode metal whereas the outer top disc is composed of or is at least plated with a metal having good corrosion resistance to the electrolyte.

I have found that a structure of this type not only provides an excellent air-tight seal for the cell but, at the same time, positively prevents the formation of corrosion or incrustations on the outer top disc. It appears that any electrolyte leakage that may pass around the edge of the inner top disc will be trapped in the interspace between the two discs and will not reach the exterior. As a result of this desirable characteristic, the cells practically never develop any contact difficulties and provide a reliable and permanent electrical connection with a contact spring throughout the useful life of the cell. Furthermore, in case any excessive internal pressures develop within the cell, such pressure will cause limited displacement of the top closure discs from the inner can so that the excess gas pressure may be released around the edge of the inner can into the interspace between the inner can and the outer jacket and from there into the atmosphere, this particular feature being more fully disclosed and claimed in Colton Patent 2,636,062, dated April 21, 1953.

Referring now more particularly to the drawing, reference numeral 10 denotes an inner casing or can of steel having a cylindrical shape and an outwardly extending flange 11 at its open end. A suitable cathode depolarizer, such as a mixture of mercuric oxide with a small proportion of graphite, is provided in the form of a cylindrical sleeve 12 which is in pressure fit and electrical contact with the inner surface of can 10. An anode in the form of a cylindrical sleeve 14 pressed from amalgamated zinc powder is also provided in can 10 and is concentrically spaced from cathode 12. A plurality of layers 15 of absorbent spacer material, such as an alkali resistant paper, are interposed between cathode 12 and anode 14. These spacer layers are saturated with an electrolyte which is preferably constituted of an alkali metal hydroxide also containing a suitable amount of dissolved zinc. An insulative spacer 16 of inert elastic material, such as a synthetic elastomer sold under the name neoprene, is provided at the bottom of can 10 and serves to prevent direct electrical contact between the anode and the can.

The top closure member of the cell is generally denoted by reference numeral 17 and comprises a pair of dished metal plates 18 and 19. It will be noted in the drawing that these dished plates have their center portions so formed that the inner disc will be nested in the outer disc and will form a tight friction-fit therewith. This is desirable in order to maintain the two discs in good and permanent electrical contact with each other.

While a friction-fit of the described type is, in most cases, sufficient to assure satisfactory electrical contact, the two discs may be spot-welded together as indicated at 20 to positively exclude any relative displacement thereof. It will be further noted that outer edges of discs 18 and 19 are slightly separated from each other and encompass an acute angle therebetween.

An insulating and sealing collar of polyethylene 21 is provided for insulating the top discs from the inner can and also to constitute an air-tight enclosure therewith. Sealing collar 21 comprises a first or body portion 22 which extends between flange 11 of inner can 10 and the circumferential edge of inner top disc 19. A second or sleeve portion 23 of the sealing collar extends along the surface of outer top disc 18.

An outer can or jacket 24 encircles the inner can, including the marginal regions of the top discs. At one end, the edge of the outer can or jacket is bent inwardly, as indicated at 25, and rests on an annular ledge 26 of the inner can. At the other end, the said jacket is crimped inwardly as indicated at 27. It will be noted that the jacket will apply axial compression on body portion 22 of sealing collar 21 and will, at the same time, apply compression in a generally radial direction upon the sleeve portion 23 of sealing collar 21. This compression of the sealing collar will also be effective in forcing an intermediate portion 28 thereof into the interspace between the edges of top discs 18 and 19. It has been found that a structure of this type provides an excellent and positively secure air-tight closure for the cell.

Preferably, the inner disc 19 is formed of or is plated with a metal having a low contact potential with respect to zinc, tin-plated steel being excellently suited for the purpose. On the other hand, outer top disc 18 is formed of or is plated with a metal having good corrosion resistance to the electrolyte and capable of maintaining a clean surface under atmospheric conditions, a suitable material for the purpose being nickel-plated steel.

From the foregoing discussion, the operation of the cell of the invention will be readily understood by those skilled in the art. It is to be observed at the outset that under normal conditions the cell is air-tightly sealed and the leakage of any electrolyte therefrom is positively prevented. This is due to the particular construction of the insulating sealing collar and to its cooperation with the marginal portions of the inner can and of the top closure member. Thus, the body portion and the sleeve portion of the sealing collar are strongly compressed in different directions and in two regions separated from each other, such sealing effect being further improved by an intermediate portion of the sealing collar being forced into the interspace between the edges of the two top discs.

It is also to be noted that the cell of the described character is completely free from the detrimental effects of electrolyte creepage. Even though the alkaline electrolytes used may have a strong tendency for creeping along any surface with which they are in contact, the electrolyte creepage along the lower surface of inner top disc 19 will travel around the edge of the said disc into the interspace between discs 18 and 19. Any electrolyte that may reach such interspace will be trapped therein and will never arrive to the exterior of the cell so that the exposed surface of outer top disc 18 will always remain clean and free from corrosion.

Furthermore, the cell structure of the invention is self-venting, that is, capable of releasing any excessive internal pressure that may result from abnormal operating conditions. Any excessive increase in the internal pressure will cause slight displacement of the inner can and of the top closure member 17 from each other which in turn increases the pressure on sleeve portion 23 of the sealing collar and will decrease the pressure that is applied to the body portion 22 of said sealing collar. As a result, the gas may pass underneath body portion 22 of the sealing collar around flange 11 of inner can 10 into the interspace 29 between inner can 10 and outer can or jacket 24. From this interspace, the gas pressure is harmlessly released between ledge 26 of the inner can and inwardly turned edge 25 of the outer can which will be slightly and elastically deformed as a result of the displacement of inner can 10 with respect to closure member 17. In order to prevent that the vented gas take any of the electrolyte with it, it is desirable to provide a body of porous material, such as a sleeve 30 of porous paper in the interspaces between inner can 10 and outer can 24. Any electrolyte reaching said sleeve will be absorbed thereby so that it will never arrive to the exterior of the cell.

Although the present invention has been disclosed as specifically applicable to alkaline primary dry cells, it may be applied with equal or similar results to other electrochemical devices, such as electrolytic condensers, electrolytic rectifiers, secondary cells, and the like. Also, the usefulness of the present invention is not limited in any way to alkaline dry cells, but is capable of producing excellent results in all types of primary and secondary cells employing a great variety of electrochemical cell systems. It is further to be noted that the double top disc structure of the invention is applicable to cells in which the self-venting construction is dispensed with. In that case, the lower portion of the outer container or can 24, starting from flange 11 of inner can 10 downwards, is omitted and upper portion 27 of the said outer can 24 is formed integrally with the inner can 10. This results in an electrode can or terminal closely similar in shape to that shown, for example, in Ruben Patent No. 2,576,266, dated November 27, 1951. Of course, in a cell of this type there is no particular necessity for providing ledge 26 on the inner can which may be formed with a flat bottom face. All of these variations and modifications are considered to be within the true spirit and the scope of the present invention, as disclosed in the foregoing description and defined by the appended claims.

I claim:

1. An electrochemical cell comprising, in combination, a metal casing, constituting one of the terminals of the cell, a top closure member for said casing constituting the other terminal of the cell and comprising a pair of metal plates superimposed upon one another, and an insulative sealing member confined between cooperating portions of said casing and of said closure member and constituting therewith a sealed enclosure for the cell while maintaining said casing and said closure member electrically disconnected from each other.

2. An electrochemical cell comprising, in combination, a metal casing, constituting one of the terminals of the cell, a top closure member for said casing constituting the other terminal of the cell and comprising a pair of metal discs superimposed upon one another, said discs having their surfaces constituted of different metals, and an insulative sealing member confined between cooperating portions of said casing and of said discs and constituting therewith a sealed enclosure for the cell while maintaining said casing and said closure member electrically disconnected from each other.

3. An electrochemical cell comprising, in combination, a metal casing, a top closure member for said casing comprising a pair of dished metal plates having their centers nested in one another and their marginal edges slightly separated from each other, and a sealing member of elastic insulating material compressed between cooperating marginal portions of said casing and of said plates and also extending into the interspace between the edges of said plates.

4. An electrochemical cell comprising, in combination, a metal casing, a top closure member for said casing comprising a pair of dished metal plates having their center regions nested in and forming a friction fit with each other and their edges separated from each other, said casing and said closure member respectively constituting the electrical terminals of the cell, and a sealing member of elastic insulating material compressed between cooperating marginal portions of said casing and of said plates and also extending into the interspace between the edges of said plates.

5. An electrical current producing cell comprising, in combination, a metal casing, a top closure member for said casing comprising an inner and an outer dished metal plate having their center portions electrically connected and their edges slightly separated, an elastic sealing collar compressed between marginal portions of said casing and of said plates and constituting therewith a sealed enclosure for said cell, active cell materials of opposed polarity in said enclosure in respective electrical contact with said casing and with said inner plate, and a body of electrolyte interposed between said cell materials.

6. An electrical current producing cell comprising, in combination, a metal casing, a top closure member for said casing comprising an inner and an outer dished metal plate having their center portions electrically connected and their edges slightly separated, an elastic insulating sealing collar compressed between marginal portions of said casing and of said plates slightly extending into the interspace between the edges of the plates and constituting therewith a sealed enclosure for the cell, a cathode and an anode in said enclosure in electrical contact with said casing and said inner top plate, respectively, and a body of electrolyte interposed between said cathode and anode whereby any electrolyte creepage will be guided around the edge of the inner top plate to be trapped within the interspace between said inner and said outer top plates.

7. An electrical current producing cell comprising, in combination, a metal casing, a top closure member therefor comprising an inner and an outer metal top disc having interfitting center regions and their edges separated, an insulating sealing collar compressed between marginal portions of said casing and of said discs, a cathode in said casing and in electrical contact therewith, an anode spaced from said cathode and in electrical contact with the inner top disc, and an electrolyte interposed between said cathode and said anode, the surface of said inner top disc being formed of metal having low electrochemical potential with respect to the anode metal and the surface of said outer top disc being formed of metal having such characteristics as to be substantially free from electrolyte creepage.

8. An alkaline dry cell comprising, in combination, a metal casing, a top closure member therefor comprising an inner and an outer top disc having interfitting contacting center regions and their edges spaced from each other, an insulating sealing collar compressed between marginal portions of said casing and of said discs and also extending into the interspace of said discs, a cathode depolarizer in said casing and in electrical contact therewith, a zinc anode spaced from said cathode and in electrical contact with the inner top disc, and an alkaline electrolyte interposed between said cathode and said anode, at least the surface of said inner top disc being formed of metal having low electrochemical potential with respect to zinc and at least the surface of said outer top disc being formed of metal which is not subject to electrolyte creepage.

9. An alkaline dry cell comprising, in combination, a metal casing, a top closure member therefor comprising an inner and an outer top disc having interfitting contacting center regions and their edges spaced from each other, an insulating sealing collar compressed between marginal portions of said casing and of said discs and also extending into the interspace of said discs, a cathode depolarizer of mercuric oxide in said casing and in electrical contact therewith, an amalgamated zinc anode spaced from said cathode and in electrical contact with the inner top disc, and an electrolyte of an alkali metal hydroxide interposed between said cathode and said anode, said inner top disc being formed of tin-plated steel and said outer top disc being formed of nickel-plated steel.

10. The cell claimed in claim 9 wherein the inner and outer top discs are permanently secured together by means of a welded joint.

11. An electrochemical cell comprising, in combination, an inner can, a top closure member therefor comprising nested inner and outer top discs having their edges spaced from each other, an insulative sealing collar having a first portion interposed between the edges of said can and of said discs and a second portion, and an outer jacket encircling at least the marginal portions of said can and of said discs, said jacket being fixed at one end with respect to said can and being at the other end constricted over said second portion of the sealing collar and forcing an intermediate portion of the sealing collar into the interspace between the edges of said discs, said top closure member and said can being capable of displacement away from each other in response to internal pressure to release such pressure.

12. An electrochemical cell comprising, in combination, positive and negative cell terminals having cooperating marginal portions, one of said terminals being cup-shaped and the other of said terminals comprising a pair of dished discs nested in each other with their edges spaced, an insulative sealing collar having a body portion extending between said cooperating marginal portions of the terminals and also having a sleeve portion, and an annular member encircling said marginal portions of the terminals and constricted over the sleeve portion of the sealing collar thereby maintaining both portions thereof under compression and also forcing an intermediate portion of the sealing collar into the interspace between the edges of said discs thereby to improve the seal.

13. A self-venting electrical current producing cell comprising, in combination, a cup-shaped cathode terminal, an anode terminal comprising inner and outer dished discs nested in each other with their edges separated, said terminals having cooperating marginal portions, an insulative sealing collar having a body portion extending between said cooperating marginal portions of the terminals and also having a sleeve portion, an annular jacket encircling said marginal portions of the terminals and crimped over the sleeve portion of the sealing collar thereby maintaining both portions thereof under compression, a cathode in contact with said cup-shaped terminal, an anode in contact with said inner disc, and a body of electrolyte interposed between said cathode and anode, the surface of said inner disc being formed of metal having low electrochemical potential with respect to the anode metal and the surface of said outer disc being formed of metal having high corrosion resistance to the electrolyte.

14. A self-venting electrical current producing cell, comprising, in combination, an inner can, a top closure member therefore comprising inner and outer dished discs nested in each other with their edges separated, an insulative sealing collar having a body portion extending between marginal portions of said can and of said closure member and also having a sleeve portion, an outer can encircling said inner can and crimped over the sleeve portion of the sealing collar thereby maintaining the sealing collar under compression, a cathode in contact with said inner can, an amalgamated zinc anode in contact with said inner disc, and an alkaline electrolyte interposed between said cathode and anode, said inner disc being formed of tin-plated steel and said outer disc being formed of nickel-plated steel.

15. A self-venting electrical current producing cell comprising, in combination, an inner can, a top closure member therefor comprising an inner disc of tin-plated steel and an outer disc of nickel-plated steel nested in each other with their edges separated, an insulative sealing collar having a body portion extending between marginal portions of said can and of said closure member and also having a sleeve portion, an outer can encircling said inner can and crimped over the sleeve portion of the sealing collar thereby maintaining the sealing collar under compression, a cathode of mercuric oxide in said inner can, an amalgamated zinc anode in contact with said inner disc, and an alkaline electrolyte interposed between said cathode and said anode, said inner can and said top closure being capable of relative displacement away from each other in response to excessive internal pressure to release such pressure around the edge of the inner can into the space between the inner and outer cans and from there into the exterior.

References Cited in the file of this patent

UNITED STATES PATENTS

| | | |
|---|---|---|
| 2,428,393 | Socke | Oct. 7, 1947 |
| 2,571,616 | Ruben | Oct. 16, 1951 |
| 2,620,368 | Ruben | Dec. 2, 1952 |
| 2,636,062 | Colton | Apr. 21, 1953 |
| 2,636,063 | Schroeder | Apr. 21, 1953 |